United States Patent [19]

Penton

[11] Patent Number: 4,511,961
[45] Date of Patent: Apr. 16, 1985

[54] APPARATUS FOR MEASURING PROGRAM EXECUTION

[75] Inventor: Perry W. Penton, Columbia, S.C.

[73] Assignee: NCR Corporation, Dayton, Ohio

[21] Appl. No.: 369,057

[22] Filed: Apr. 16, 1982

[51] Int. Cl.³ .................... G06F 11/28; G06F 9/06
[52] U.S. Cl. .................................................. 364/200
[58] Field of Search ........................ 377/16, 20, 26; 364/200 MS File, 900 MS File

[56] References Cited

U.S. PATENT DOCUMENTS

| | | | |
|---|---|---|---|
| 4,053,947 | 10/1977 | Calsson et al. | 364/200 |
| 4,084,154 | 4/1978 | Panigrahi | 364/900 |
| 4,192,130 | 5/1980 | Takeuchi | 377/26 |
| 4,302,820 | 11/1981 | Struger et al. | 364/900 |
| 4,382,179 | 5/1983 | Penton | 364/200 X |

*Primary Examiner*—Harvey E. Springborn
*Attorney, Agent, or Firm*—Wilbert Hawk, Jr.; Albert L. Sessler, Jr.; Elmer Wargo

[57] ABSTRACT

A measuring apparatus for measuring the time of execution of instructions or the number of cycles that addresses are within a selected address range of a memory. The measurement includes a measurement of any common subroutines that have been called by the instructions within the selected range. The measuring apparatus includes range circuitry connected to the address bus of the memory that detects instruction addresses within the selected range and instruction addresses within a common range having the common subroutines. The measuring apparatus further includes link logic for controlling a counter to both measure the instructions within the selected range and measure instructions within the common range when they immediately follow the selected range on the address bus. In the preferred embodiment, the memory is organized in ranges so that the first range begins at the first memory location in the memory and the last range ends at the last memory location in the memory. Any one of the ranges can be designated as a common range. The counter circuitry includes a plurality of counters, one associated with each of the ranges. Each counter can measure instruction addresses within its associated range and instruction addresses within a common range that immediately follow its associated range.

14 Claims, 12 Drawing Figures

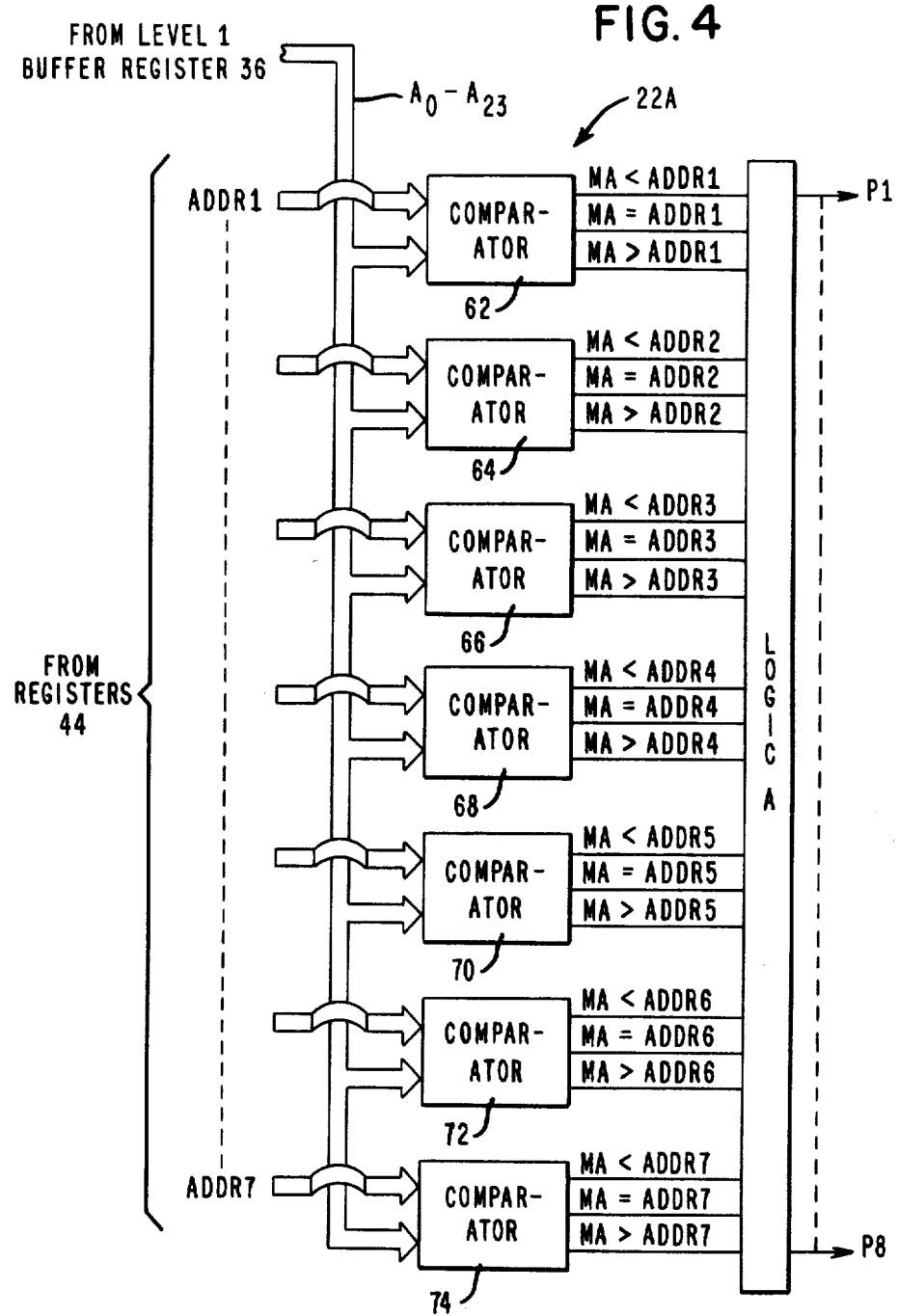

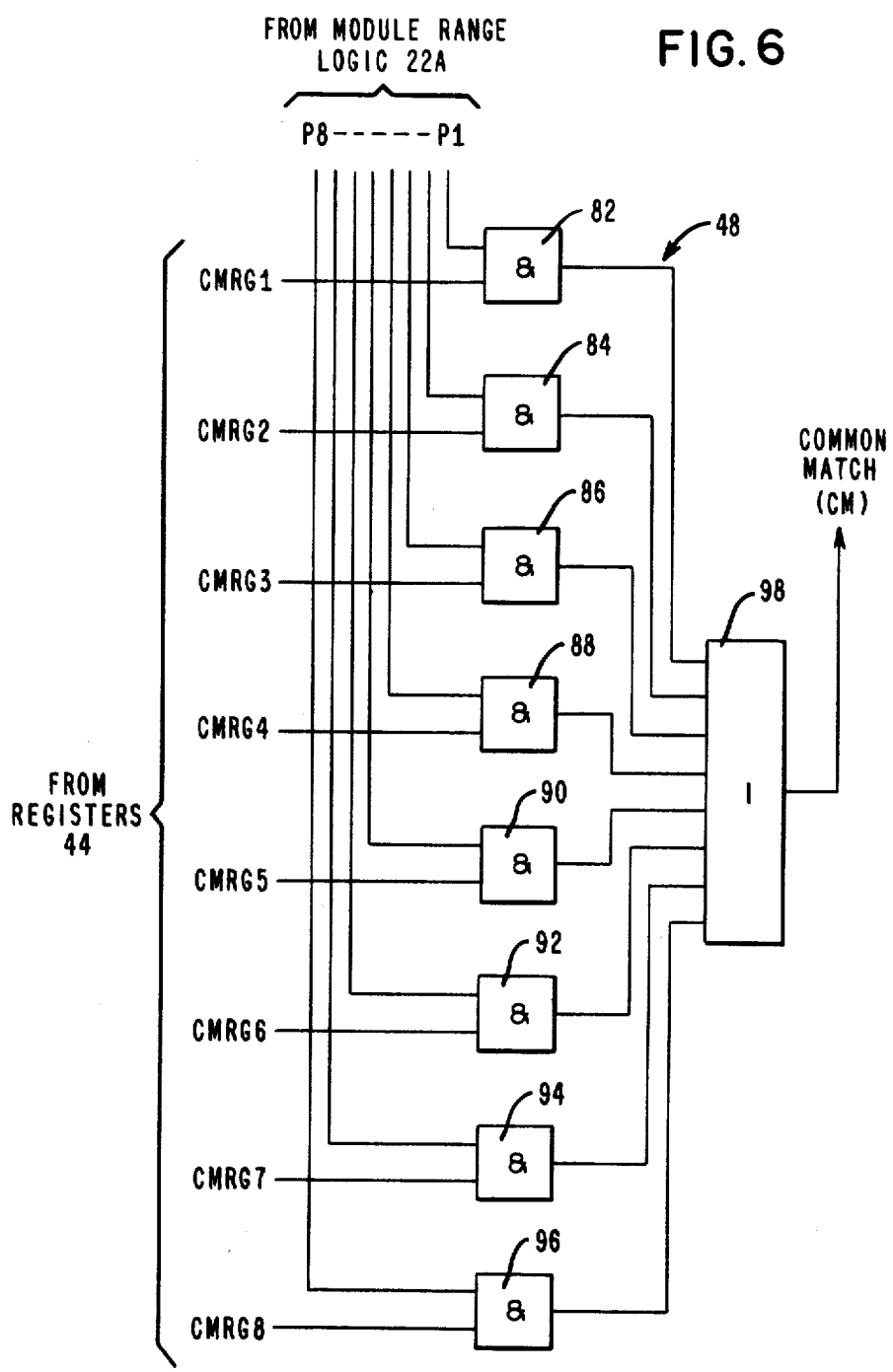

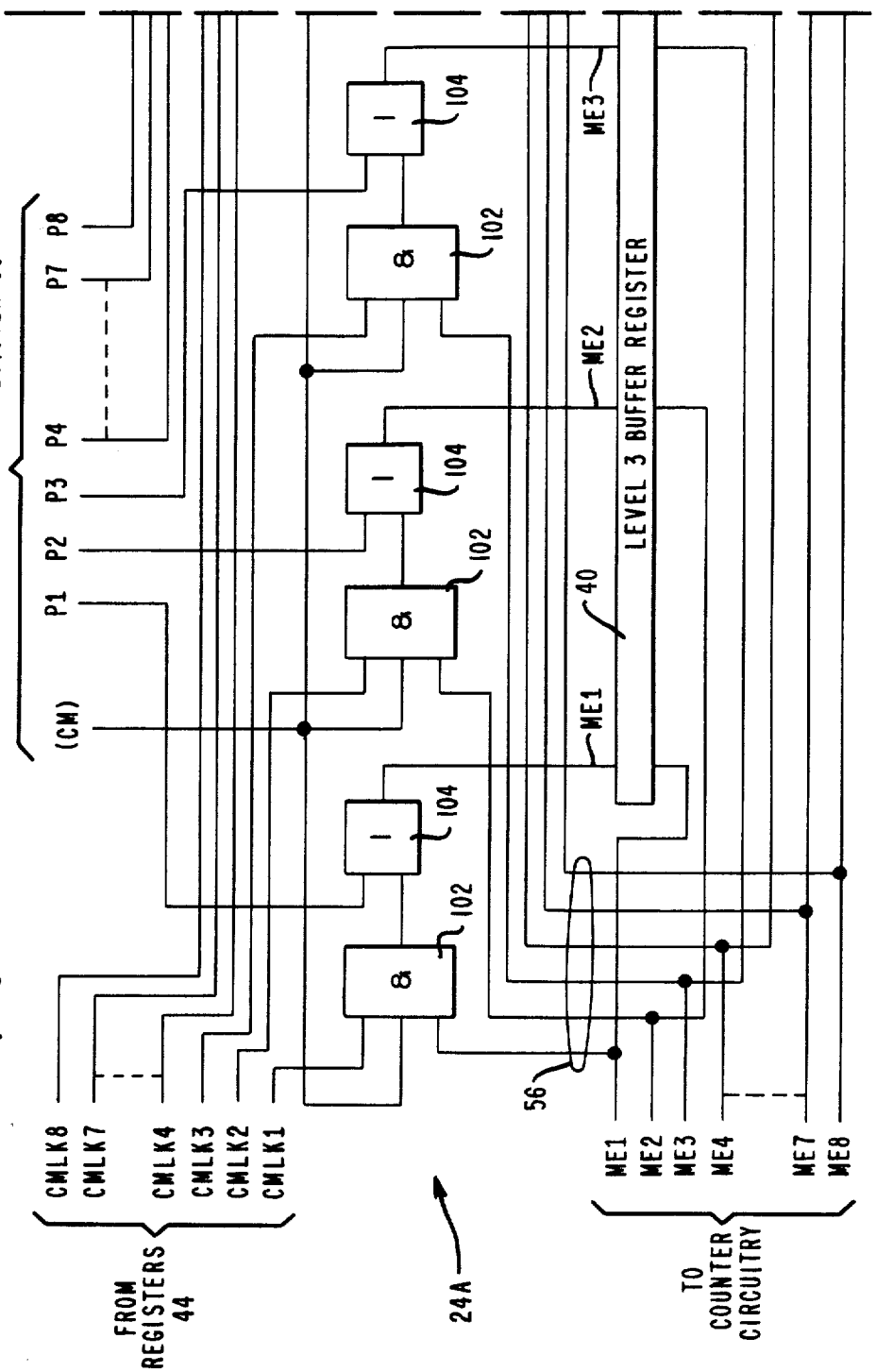

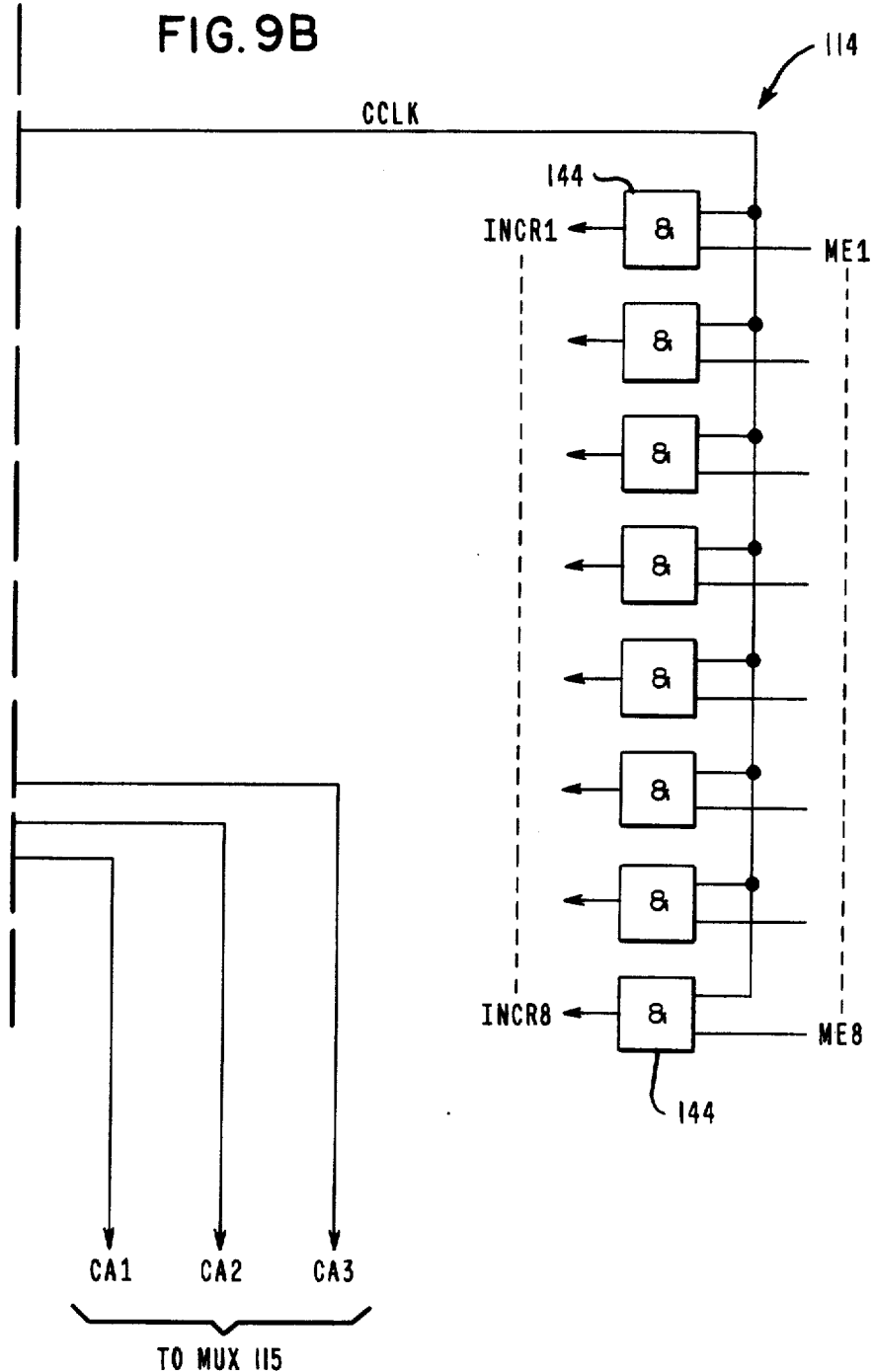

APPARATUS FOR MEASURING PROGRAM EXECUTION

The present invention relates to data processing systems and, more particularly, to an apparatus for measuring the execution of instructions or programs in such systems.

Data processing systems often require thorough testing and diagnosis, to assure that design and manufacturing defects do not exist which might affect the efficiency of the system's operations. Such testing is done on the software of the system as well as the hardware.

For software, testing is often accomplished by measuring the amount of time that it takes the processor of the system to execute a specified portion of the software. For example, software that is used in conjunction with a relatively large data processing system can often be treated as a set of individual software subprograms or modules that each perform one major function in the system. While the system is operating, if the system spends an excessive amount of time in the execution of the instructions within one of these modules, the speed and efficiency of the entire system can be affected. By measuring the amount of time that is used to execute any selected module, it can be determined that the system is spending too much of its processing time on the selected module and appropriate corrections can be made in the software to assure that the use of the system's processor is more evenly distributed among each of the modules.

In U.S. patent application Ser. No. 170,379, filed July 21, 1980 now U.S. Pat. No. 4,382,179 which issued May 3, 1983 and assigned to the same assignee as the present application, there is disclosed an apparatus for measuring the execution of instructions by comparing addresses on a memory bus of a system-under-test with upper and lower address limits. When the memory address of an executed instruction is within a range defined by the upper and lower limits, a counter is used to measure the execution. Different ranges or modules that are to be measured are selected by providing different upper and lower address limits to the apparatus.

One difficulty that has been encountered in a measuring apparatus of the type disclosed in aforementioned U.S. application Ser. No. 170,379, is that the complete execution of the instructions within the memory range at a selected software module may require that "common" subroutines or data that are not stored within the range of the selected software module also be called or accessed. Of course, if the measuring apparatus measures only the addresses within the selected range, and not data or instructions within a common subroutine outside the selected range, the measurement will not accurately reflect the amount of time used by the processor to completely perform the function of the module.

Accordingly, there has arisen the need for a measuring apparatus that includes, in the measurement of accessing or execution of instructions within the range of a selected software module, a measurement of the execution of instructions or accessing of data outside the range, when such instruction or data may be called or accessed during the execution of instructions within the selected software module.

SUMMARY OF THE INVENTION

There is provided, in accordance with the present invention, an apparatus for measuring the execution of instructions in a data processing system, where the instructions are each stored at a memory location in a memory of the data processing system. The measuring apparatus includes, in its measurement of the execution of instructions within a selected range or software module within the memory, the execution of instructions or the accessing of data outside the selected range but resulting from the execution of instructions within the selected range and necessary for completion of the function or task of the selected range.

In particular, the measuring apparatus of the present invention includes range detection means connected to a memory bus and responsive to the memory addresses thereon, wherein each memory address on the memory bus represents the execution of the instruction or the accessing of the data at the memory location defined by that memory address. The range detection means includes circuitry for detecting the presence of memory addresses within a first range that has lower and upper limits chosen to define a selected software module, and circuitry for detecting the presence of memory addresses within a second range that, for example, has lower and upper limits chosen to define a common subroutine.

Counter means, in the form of a binary counter, is provided for measuring the presence of the memory addresses within the first range. Link logic means controls the counter means so that, when a memory address within the second range immediately follows a memory address within the first range, a measurement of the addresses within the second range is included within the measurement of the addresses within the first range.

In the disclosed preferred embodiment, a data processing system has a memory which stores software modules that each perform a particular software function, common software subroutines that may be accessed or called for execution during the execution of instructions within any one of the software modules, and data that may be accessed during the execution of instructions. The measuring apparatus includes module range logic that is provided with memory range limit addresses for defining the limits of eight ranges of memory addresses, with the lowest range beginning with the first memory address of the memory and the eighth range ending with the last memory address in the memory. The software modules, the common subroutines, and the data within the memory are grouped or arranged into the eight ranges by selection of the addresses provided to the module range logic. In addition, any one of the ranges (but preferably the one or more ranges in which the common subroutines are grouped) are designated a common range so that memory addresses within the common range are included within the measurement of memory addresses within at least a selected one of the other eight ranges.

Link logic circuitry and counter circuitry is connected to the module range logic. The counter circuitry includes eight counters, one counter associated with each of the eight ranges, with each counter maintaining a count for measuring the presence of the memory addresses occurring within its associated range. Each counter is incremented by reference clocking signals whenever memory addresses are within the associated range so that the length of time that addresses within the range are present on the bus is measured or counted.

The link logic circuitry controls the counter circuitry so that when a memory address on the bus is within the common range, the measurement of the addresses within the common range will be included in the count or measurement associated with a selected one or more of the other of the eight ranges, as long as a memory address within the common range immediately follows a memory address within the selected one of the eight ranges.

It is, therefore, an object of the present invention to provide an apparatus for testing the operation of a data processing system.

It is another object of the present invention to provide an apparatus to aid in testing software in a data processing system.

It is yet another object of the present invention to provide improved apparatus for measuring the execution of instructions within a software module of a data processing system.

Still another object of the present invention is to provide an apparatus for accurately measuring the time required for execution of a first software module within a data processing system and that will include in that measurement the execution of instructions or accessing of data outside the first module that is required to complete execution of the first module.

These and other objects of the present invention will become more apparent from the following description when taken in conjunction with the accompanying drawings, wherein like reference numbers indicate like parts.

BRIEF DESCRIPTION OF THE DRAWINGS

FIG. 4 is a block diagram of the module range logic in the measuring apparatus of FIGS. 3A and 3B.

FIG. 6 is a logic diagram of the common range logic in the measuring apparatus of FIGS. 3A and 3B.

FIGS. 7A and 7B are a logic diagram illustrating the link logic and its connection to the level 3 buffer register in the measuring apparatus of FIGS. 3A and 3B.

FIGS. 9A and 9B are a logic diagram of the counter control logic of the counter circuitry seen in FIG. 8.

DETAILED DESCRIPTION OF THE PREFERRED EMBODIMENT

Figure 1:
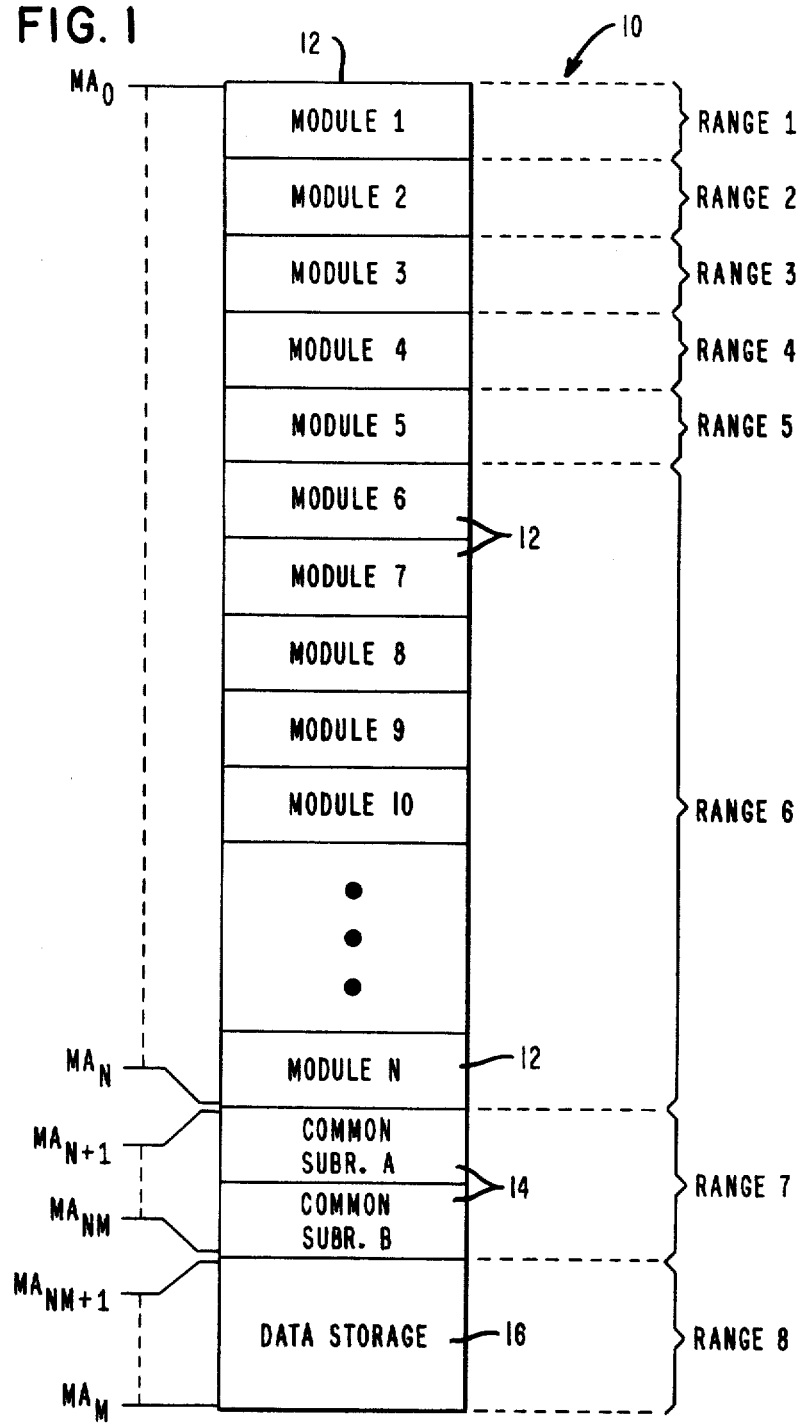
FIG. 1 is a diagram illustrating the contents of a memory in a system-under-test.

In order to understand the purpose of the present invention, reference can first be had to FIG. 1, which illustrates a memory 10 of a system-under-test. In particular, the memory 10 represents the main memory of a data processing system that is to be tested, with the memory 10 storing instructions and data needed by the data processing system in order to perform its programmed functions. For purposes of describing the present invention, it can be assumed that the memory 10 is a 16 megabyte memory, i.e., it has 16 million addressable memory locations beginning at its first memory location at address $MA_0$ and ending at its last location at address $MA_M$. Each memory location either stores an instruction or a portion of an instruction one byte in length, or stores a byte of data needed by the system when executing the instructions. Assuming a 16 megabyte memory, 24 address bits are required to address or access any location in the memory 10.

The instructions stored in the memory 10 of FIG. 1 are illustrated as arranged in a plurality of software modules 12, and in two common subroutines 14. The software modules 12 are individually designated as "module A" through "module N", and occupy memory locations $MA_0$ through $MA_N$ in memory 10. The common subroutines 14 are individually designated as "common subr. A" and "common subr. B", and occupy memory locations $MA_{N+1}$ through $MA_{NM}$ in memory 10.

Also shown in FIG. 1 is a portion 16 of the memory 10 that is labeled "data storage". The data stored in the data storage portion 16 of the memory 10 is normally data needed during the execution of instructions in the software modules 1 through N or in the common subroutines A and B. In FIG. 1, data in the data storage begins at memory location $MA_{NM+1}$ and ends at the last memory location in the memory at $MA_M$.

The placement of the common subroutines 14 and the data storage portion 16 are shown together at the end of the memory 10 for illustrative purposes only, and in actual practice they could be located at any of the memory locations in memory 10.

The instructions grouped within each one of the software modules 12 can be thought of as a routine or subprogram that performs generally a single major function needed by the system-under-test during its normal operation. Examples of software modules that are commonly found in conventional systems are modules or routines that operate input/output devices, that encrypt data for transmission to another system, that manage the memory in the event the memory is comprised of several memory portions, and many other functions that are commonly found in either operating system software or application software. The specific functions performed by any one of the software modules is unimportant for purposes of describing the present invention and will not be described in any further detail herein.

The common subroutines A and B are representative of subroutines that perform a software operation or function that might be needed during the execution of more than one of the software modules 12. They can include, for example, a subroutine that moves data between working registers of the system, a subroutine that performs common arithmetical or logic functions, and so forth. Since several software modules 12 might need the function of one of the common subroutines 14, the various common subroutines are not duplicated in each of those modules. Rather, to save memory space, each common subroutine is stored only once in the memory, and each of the software modules calls the common subroutine when needed. Although only two common subroutines are illustrated, it should be understood that the number would normally be larger, depending upon the particular operations being performed by the system. The common subroutines 14 are usually executed by a call instruction within one of the software modules 12, and after execution, the processor of the system returns to that same one of the software modules 12 by a return instruction.

The modules 12, common subroutines 14, and data storage portion 16 are shown in FIG. 1, according to the invention, as arranged in eight ranges, labeled "range 1" through "range 8". These ranges are selected in advance, with the selection depending upon which of the modules 12 a measurement is needed for. The use of the ranges 1–8 will be described later in conjunction with the operation of the measuring apparatus illustrated in FIGS. 2 through 9B.

As mentioned earlier, one approach to testing software being executed by a system, such as is disclosed in the aforementioned U.S. application Ser. No. 170,379, is the detection of memory addresses being used to access memory locations within a memory, such as the illustrated memory 10. In this manner, one can determine, for example, the amount of time that it takes to execute the instructions within a range representing a selected one of the software modules. However, if the selected software module being measured calls one of the common subroutines 14, or if it frequently accesses data in the data storage portion 16 of the memory 10, an accurate measurement cannot be obtained since the common subroutines 14 and the data storage portion 16 do not lie within the memory address boundaries of the selected software module, and thus the addresses within the common subroutines or the data storage are not within the range being measured.

Figure 2:
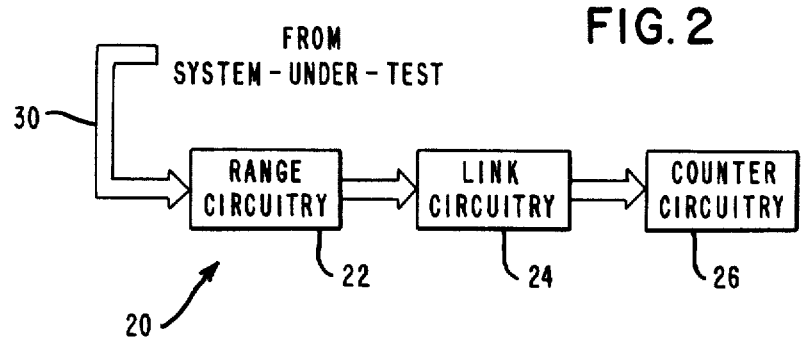
FIG. 2 is a simplfied block diagram illustrating the major functional components of a measuring apparatus in accordance with the present invention.

In order to overcome this difficulty, a measuring apparatus 20 in accordance with the present invention is illustrated in its simplest form in FIG. 2. The measuring apparatus 20 can be used with the memory 10 of FIG. 1 and, as can be seen in FIG. 2, the apparatus 20 includes range circuitry 22, link circuitry 24 and counter circuitry 26. The range circuitry 22 receives memory addresses from a memory address bus 30 of the system-under-test. The memory addresses are provided on bus 30 to access individual memory locations in order to execute instructions or access data within the memory 10 of FIG. 1, specifically the instructions within the software modules 12 and within the common subroutines 14, and the data within the data storage portion 16.

As will be more fully described later in conjunction with the specific embodiment shown in FIGS. 3A through 9B, the range circuitry 22 determines whether the memory addresses on the memory bus 30 fall within predetermined memory address ranges that each define one or more of the software modules 12, common subroutines 14 and data storage portion 16. The ranges are preselected and, although they can be chosen to include any portion of the memory 10, in the preferred practice of the present invention they are chosen in advance so that each selected software module to be measured is a single range (hereinafter also referred to as the range-to-be-measured), and the common subroutines A and B are together a single range (hereinafter also referred to as the "common range".) In addition, since it might be desired to also account for time during which data in the data storage portion 16 is being accessed, the data storage portion 16 can be included in the common range.

The link circuitry 24 is generally responsive to the range circuitry 22 and controls the counter circuitry 26 in order to maintain a measurement for the range-to-be-measured. According to an important aspect of the present invention, the link circuitry 24 controls the counter circuitry 26 to measure execution of instructions within the range-to-be-measured and, in addition, to include within that measurement the execution of any instructions in the common range called during execution of the instructions within the range-to-be-measured.

The function of the link circuitry 24 as just described permits a more accurate total measurement of the actual time that is taken by the processor of the system-under-test to completely execute all the instructions and access all of the data for the selected software module being measured. The specific circuitry within the link circuitry 24 for controlling the counter circuitry 26 to "link" or combine the measurement of the selected module with the measurement of, say, the common subroutines called during execution of the selected module, will be described later in conjunction with FIGS. 7A and 7B. For present purposes, however, it should be noted that the link circuitry 24 accomplishes the above described function by controlling the counter 26 to include, in its measurement of instructions or addresses within the range-to-be-measured, any addresses on the bus 30 within the common range that immediately follow an address within the range-to-be-measured.

As will be described later in conjunction with the specific circuitry shown in FIGS. 8, 9A and 9B, the counter circuitry 26 can be used to time the execution of the instructions within the range-to-be-measured by incrementing at a known frequency during any period in which addresses on the bus 30 fall within the range-to-be-measured. In the preferred embodiment to be described later, the counter circuitry 26 includes eight counters, one associated with each of the eight ranges of the memory 10 in FIG. 1, and any of the ranges can be a range-to-be-measured or a common range. Each counter maintains a measurement for its associated range.

To summarize, then, the important aspects of the preceding discussion, the range circuitry 22 detects the accessing of instructions or data that are in at least one range-to-be-measured and at least one common address range. The counter circuitry 26 measures the addresses within the selected range-to-be-measured, under the control of the link circuitry 24. The link circuitry 24 also controls the counter circuitry 26 so that when range circuitry 22 detects an address within the common range, and that address immediately follows an address within the range-to-be-measured, the counter circuitry 26 includes in its measurement also a measurement of the addresses in the common range.

Figure 3B:
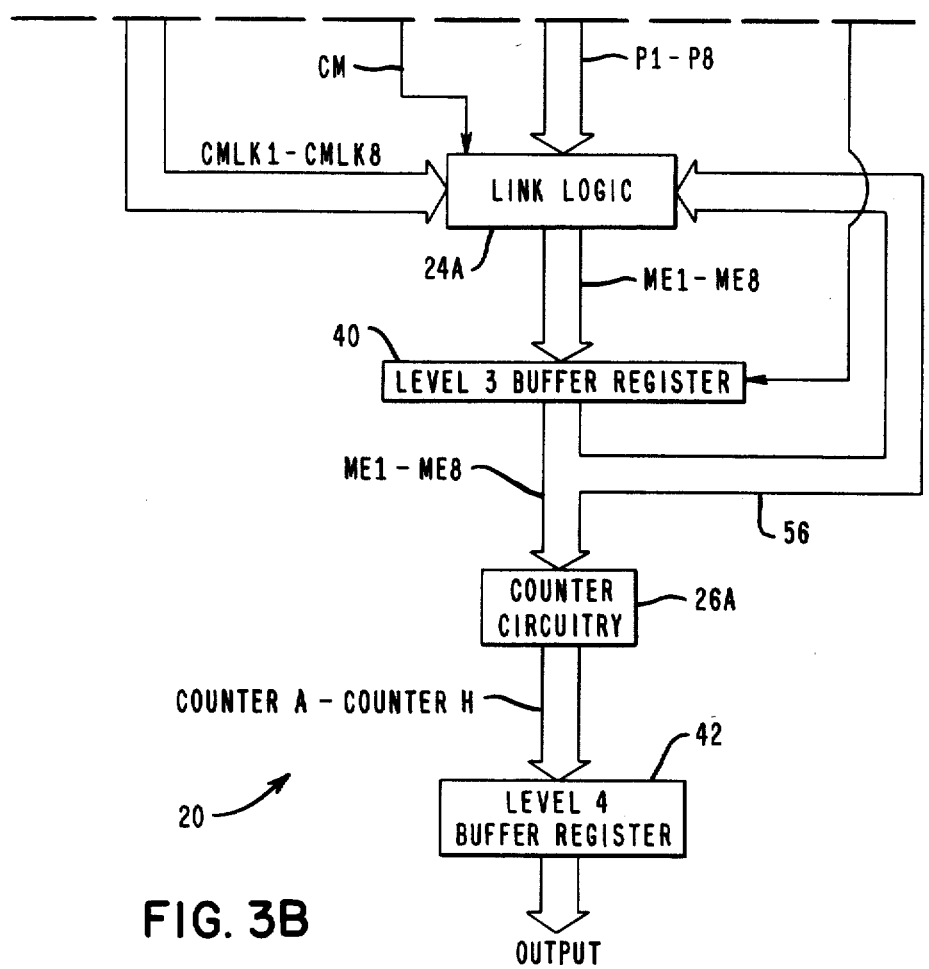
FIGS. 3A and 3B are a simplified block diagram of a measuring apparatus representing a preferred embodiment of the present invention.
Figure 3A:
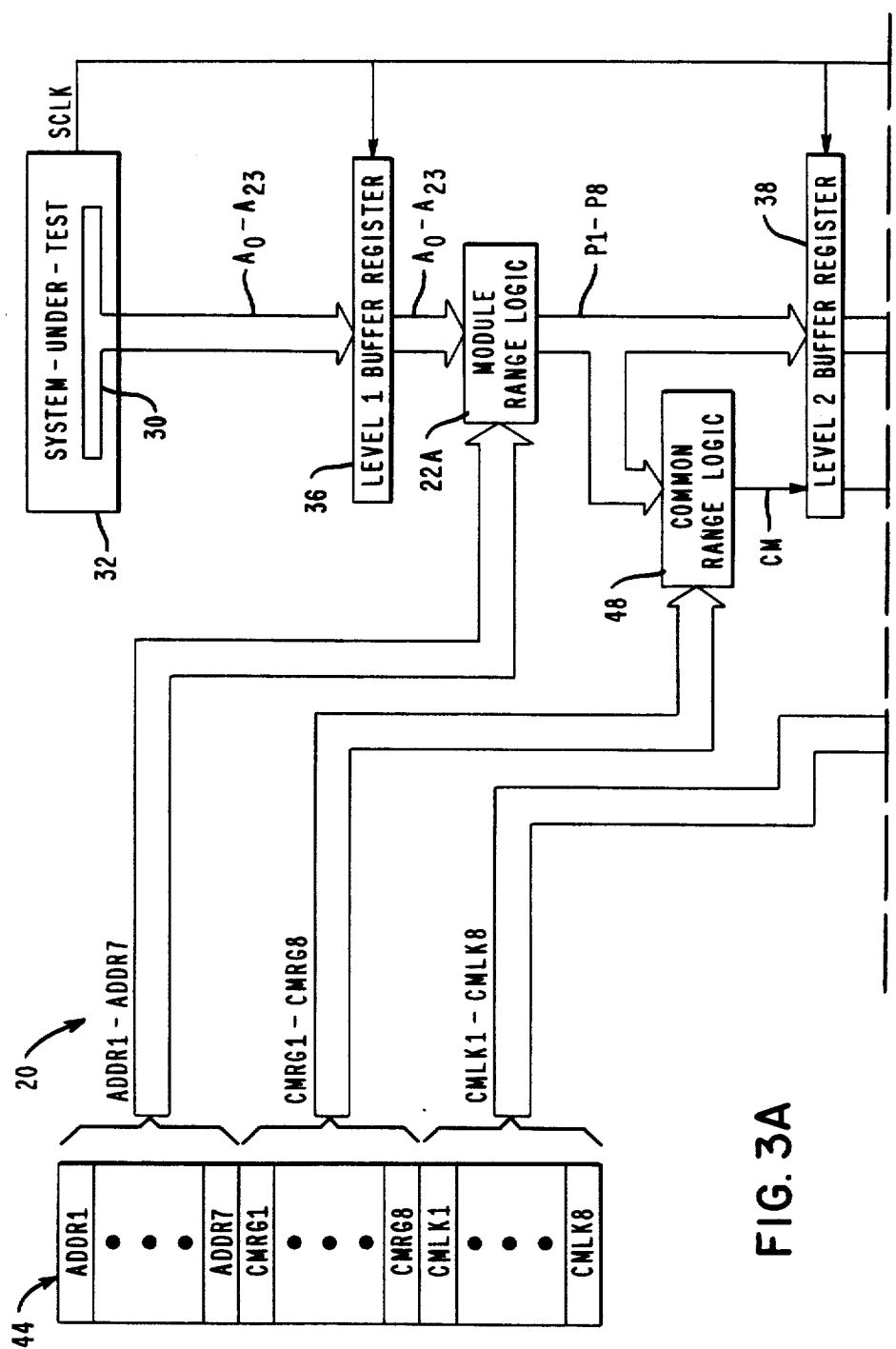

Turning now to FIGS. 3A and 3B, there is shown in greater detail the measuring apparatus 20 for measuring the execution of instructions within one or more ranges-to-be-measured in the memory of an illustrated system-under-test 32. As can be seen in FIGS. 3A and 3B, the measuring apparatus 20 has four levels of buffer registers, including a level 1 buffer register 36, a level 2 buffer register 38, a level 3 buffer register 40, and a level 4 buffer register 42. The test information (initially the form of memory addresses) received from the memory address bus 30 of the system-under-test 32 is passed through the measuring apparatus 20 and is buffered by the buffer registers 36, 38, 40 and 42 in a "pipeline" fashion. This pipeline feature permits the test data associated with each memory address received on bus 30 from the system-under-test to be properly measured even though the total amount of processing time for apparatus 20 to include each memory address in a measurement is greater than the time between each memory cycle on bus 30. As should be appreciated by those skilled in the art, by using a pipeline technique, the design of apparatus 20 is such that it can process each memory cycle on bus 30 as long as test data can be transferred from one of the buffer registers 36–42 to the next of the buffer registers 36–42 in less time than the length of each memory cycle. The level 3 buffer register 40 also is used, in a manner which will be described later, with link logic 24A in FIG. 3B, to include the measurement of addresses in a common range within the measurement of a selected range-to-be-measured that it immediately follows.

In FIG. 3A, the measuring apparatus 20 receives, in addition to twenty-four memory address bits $A_0$–$A_{23}$ from the memory address bus 30 of the system-under-test 32, a system clock signal SCLK from the system-under-test. The system clock signal SCLK is the signal used by the system-under-test to synchronize or clock the address information on the memory address bus 30 and can be conveniently used by the measuring apparatus 20 to clock test data as it is passed through each of the buffer registers 36, 38 and 40.

Each memory address received from bus 30 of the system-under-test 32 is stored in the buffer register 36 and is then provided to module range logic 22A.

In the preferred embodiment shown generally in FIGS. 3A and 3B, the measuring apparatus 20 can make a measurement for each of the eight preselected address ranges in the memory 10 (FIG. 1) of the system-under-test 32. The first range begins or has a lower limit at the first memory address ($MA_0$) in memory 10 and the last range ends or has an upper limit at the last address ($MA_M$) in memory 10. As will be described shortly, the other lower and upper limits of the eight ranges can be preselected, with the selection made so that any software module for which a measurement is sought is coextensive with one of the eight ranges, and the common subroutine or subroutines which are to be included in that measurement are coextensive with another of the eight ranges. The module range logic 22A in FIG. 3A determines which of the eight address ranges the memory address on bus 30 falls within.

A set of registers 44, seen to the left in FIG. 3A, contains control signals or bits for the measuring apparatus 20 in order to control various components thereof. With regard to the module range logic 22A, the registers 44 provide seven sets of range limit address signals or bits, the sets of bits identified as ADDR1 through ADDR7, which establish the lower and upper limits of each of the eight ranges, as will be more fully described below in conjunction with FIG. 4. For purposes of the present description, it can be assumed that the sets of bits ADDR1–ADDR7, as well as the other control bits in the registers 44 that will be described later, are provided to the registers 44 by the closing of switches or the like. Of course, the registers 44 could, alternatively, be loaded with bits by a programmed microprocessor in a conventional fashion, using an input device such as a keyboard.

The output of the module range logic 22A is eight bits, P1 through P8, that are each associated with one of the eight preselected ranges and that are individually enabled to indicate which one of the eight preselected ranges the memory address received from the system-under-test 32 falls within. The bits P1 through P8 are provided both to common range logic 48 and to the level 2 buffer register 38. The common range logic 48 determines if the range within which the memory address from the system-under-test falls is one which has been selected or designated as a "common range". As has been previously mentioned, a common range is one or more of the eight preselected ranges that is to have the measurement or count of its instructions or data included in the measurement of another range. One or more contiguous common subroutines in memory 10 will typically be chosen to be a single common range.

The common range logic 48 receives from the registers 44 eight common range bits CMRG1–CMRG8, each associated with one of the eight ranges and indicating whether its associated range has been selected as a common range, i.e., selected to be included in the measurement of any other range. The output of the common range logic 48 is a single common range match bit, identified as CM, that is stored in the level 2 buffer register along with the bits P1 through P8 from the module range logic 22A. If the bit CM is enabled, then the range that the current address on bus 30 is within, as identified by the enabled one of the bits P1–P8, is a common range.

The bits (CM and P1–P8) stored in the level 2 buffer register 38 are provided to link logic 24A (Fig. 3B). The link logic 24A also receives eight bits CMLK1 through CMLK8 from the registers 44. Each of the bits CMLK1 through CMLK8 correspond to one of the eight ranges within the memory 10 of the system-under-test and each bit indicates whether the measurement being made of its corresponding range should also include the measurement of the common range or ranges designated by the bits CMRG1–CMRG8. In response to the bits P1–P8 and the bit CM from the module range logic 22A and common range logic 48, respectively, the link logic 24A generates eight measurement enabling bits ME1–ME8, by way of and in cooperation with the level 3 buffer register 40.

As can be seen in FIG. 3B, a feedback path 56 is provided from the output of the buffer register 40 to the link logic 24A. The path 56 is used by the link logic 24A in order to permit a common range to be included in the measurement of a selected range-to-be-measured only when an address within the common range immediately follows an address within the range-to-be-measured. A more detailed description of the operation of the link logic 24A and level 3 buffer register 40 will follow later in conjunction with FIGS. 7A and 7B.

The measurement enabling bits ME1–ME8 from level 3 buffer register 40 are provided to counter circuitry 26A. Counter circuitry 26A includes the eight counters mentioned earlier that are each enabled by respective ones of bits ME1–ME8 to measure the execution of instructions (or accessing of data) from the memory 10 within its associated one of the eight ranges.

The output of the counter circuitry 26A is, for purposes of describing the embodiment shown in FIGS. 3A and 3B, illustrated as eight sets of bits, COUNTERA through COUNTERH. Each set of bits COUNTERA through COUNTERH represents the output of one of the eight counters in the counter circuitry 26A. If it is assumed that the eight counters are each twenty-bit counters, then the sets of bits COUNTERA-COUNTERH are each twenty-bits.

The sets of bits COUNTERA through COUNTERH are provided to the level 4 buffer register 42. Although not shown in FIG. 3B, the buffer register 42 is clocked at a sufficiently high frequency in order to receive the counter outputs from the counter circuitry 26A so that the count in each of the eight counters is sampled and stored in the buffer register 42 before the counters would normally have the opportunity to overflow. It should be noted that in a specific preferred form of the present invention, as will be described in conjunction with FIGS. 8, 9A and 9B, the counter circuitry 26A is operated so that each of the eight counters are sequentially enabled to provide its 20-bit output to the buffer 42. This, of course, minimizes both the number of lines interconnecting the counter circuitry 26A and buffer 42 and the size of the buffer register 42 itself.

The output of the level 4 buffer register 42 is provided at the output of the measuring apparatus 20 and may either be displayed, for example, at a CRT or the like, or may be stored in a suitable memory device for later retrieval and processing.

Turning now to FIG. 4, there is illustrated, in block form, the circuitry within the module range logic 22A of FIG. 3A. As can be seen, the module range logic 22A receives each of the seven sets of address signals ADDR1-ADDR7 from the registers 44, each of the sets of signals ADDR1-ADDR7 indicating, as mentioned earlier, one of seven memory adoresses in order to define the eight ranges which will be measured by the measuring apparatus 20. If the memory 10 of the system-under-test 32 is a 16 megabyte memory, then each of the sets ADDR1-ADDR7 is twenty-four bits in length. The module range logic 22A also receives, by way of the level 1 buffer register 36, the memory address bits $A_0$–$A_{23}$ from the memory bus 30 (FIG. 3A) of the system-under-test. The module range logic includes seven comparators 62, 64, 66, 68, 70, 72 and 74, each of the comparators for receiving an associated one of the seven sets of signals ADDR1-ADDR7, respectively. The module range logic further includes a block of logic identified as "Logic A" that will be shown in greater detail in FIG. 5. The output of logic A is the eight range indicating signals P1-P8 that, as previously described, indicate which of the eight ranges the address on the memory bus 30 is within.

As will become more apparent shortly, it is possible (using only seven sets of address bits ADDR1-ADDR7) to define eight ranges and check for memory addresses within each of those eight ranges within the module range logic 22A, since memory 10 in FIG. 1 is arranged so that the lower limit of the first range is the beginning or first address within the memory 10 and the upper limit of the last range is the ending or last address within the memory 10.

Each of the comparators 62-74 compares each memory address from the bus 30 with its associated one of the address signals ADDR1-ADDR7. The outputs of the comparators indicate, as illustrated in FIG. 4, any one of three conditions relative to its associated one of the address signals ADDR1-ADDR7. For example, the three outputs of comparator 62, represented by the expressions MA<ADDR1, MA=ADDR1, and MA>ADDR1, indicate whether the memory address (MA) on bus 30 is less than ADDR1 (MA<ADDR1), is equal to ADDR1 (MA=ADDR1), or is greater than ADDR1 (MA>ADDR1). The comparators 64-74 provide corresponding outputs for each of their associated address signals. A commercially available circuit suitable for use in performing the function of each of the comparators 62-74 is circuit No. SN74LS682, from Texas Instruments, Incorporated.

Figure 5:
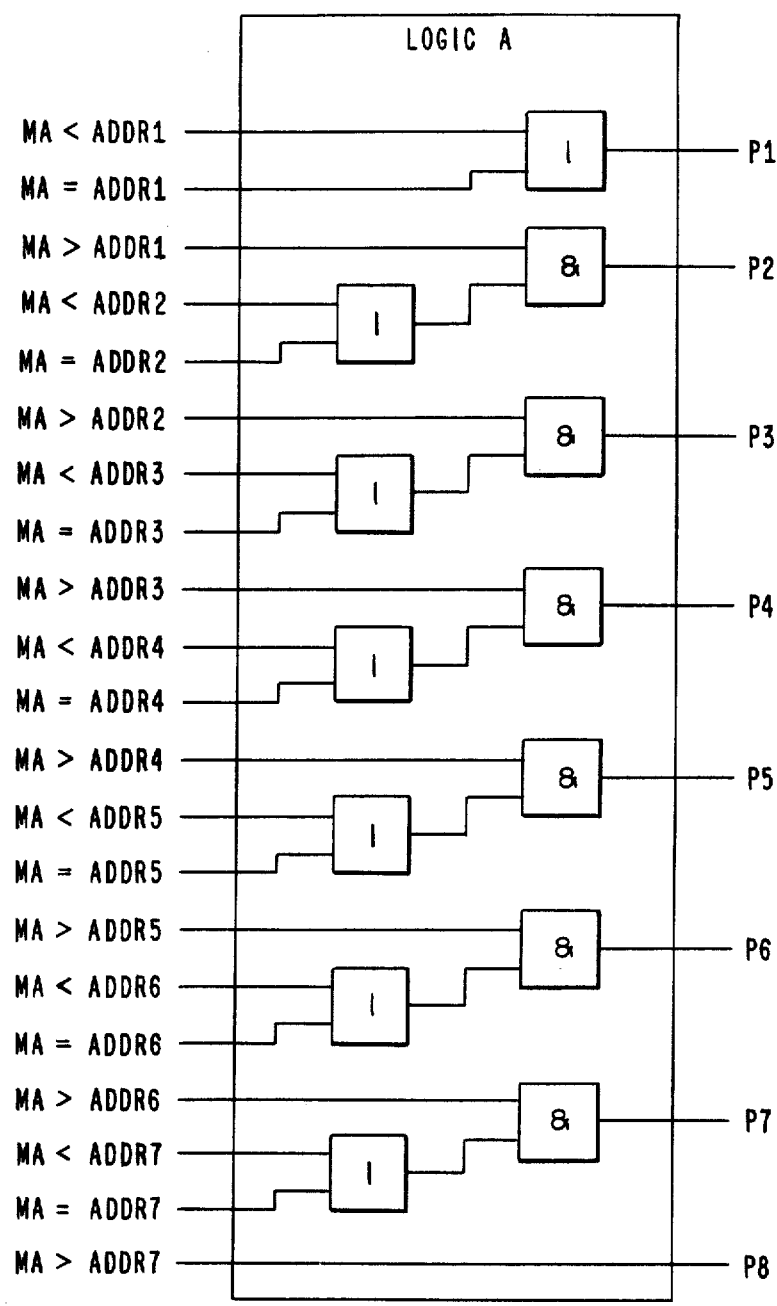
FIG. 5 is a detailed logic diagram of the Logic A block of the module range logic seen in FIG. 4.

The circuitry within the block identified as Logic A in FIG. 4 is shown in detail in FIG. 5 as comprised of logic OR and logic AND gates. For example, the range indicating bit P1 is the output of an OR gate that receives two of the outputs (MA<ADDR1 and MA=ADDR1) of comparator 62. The range indicating bit P2 is the output of an AND gate which receives one of the outputs (MA>ADDR1) of comparator 62 and receives two of the outputs (MA<ADDR2 and MA=ADDR2) of comparator 64 by way of an OR gate. As shown in FIG. 5, the range indicating bits P3-P7 are generated similarly to P2, and the range indicating signal P8 is provided by simply passing through the output MA>ADDR7 of comparator 74.

The operation of the module range logic 22A will now be described with reference to FIGS. 1, 4 and 5. As illustrated in FIG. 1, the memory 10 is organized in eight ranges that are identified as range 1 through range 8. The ranges are selected by the range address signals ADDR1-ADDR7 that are stored in the register 44 (FIG. 3). In the specific arrangement shown in FIG. 1, the ranges have been selected so that module 1 through module 5 are range 1 through range 5, respectively, and module 6 through module N are, collectively, all within range 6. The common subroutines A and B are, together, within range 7, and the data storage portion 16 is range 8.

The arrangement shown in FIG. 1 has been chosen so that individual measurements can be made for the execution of instructions within each of modules 1-5, even when the complete execution of the instructions within those modules might require execution of either common subroutine A or common subroutine B. In addition, the measurements associated with each of modules 1-5 can also be made to include any accessing of data within the data storage portion 16.

In the arrangement shown in FIG. 1, the range address signals ADDR1-ADDR5 each represent the upper limit, i.e., the last address, of each of the ranges 1-5, and would also each represent the last memory address within each of the software modules 1-5, respectively. Since range 6 includes all the software modules 6-N, the range address signal ADDR6 represents the upper limit of range 6 and the last memory address location within module N (address $MA_N$). Since range 7 includes both common subroutine A and common subroutine B, the range address signal ADDR7 is the last memory address of common subroutine B (address $MA_{NM}$). Since the upper limit of range 8 is already established as the ending address ($MA_M$) of the memory 10, there is, of course, no need for an eighth range address signal, and range 8 will include the address ($MA_{NM+1}$) immediately following the upper limit of RANGE 7 and will extend up to and include the ending address ($MA_M$) of memory 10.

When a memory address appears on the memory address bus, it is provided to each of the comparators 62-74 in the module range logic 22A of FIG. 4. The outputs of the comparators 62-74 are then provided to logic A in FIG. 5, which determines which of the eight ranges the memory address falls within. For example, if the memory address is less than or equal to the range address ADDR1, which is both the upper limit of range 1 and the last memory location within module 1, then it is within range 1 and the bit P1 is enabled. If the memory address is greater than ADDR1, but is less than or equal to ADDR2, then the memory address is within range 2 and the bit P2 is enabled. The bits P3-P7 are generated similarly, and bit P8 is generated when the memory address on the bus 30 is greater than the signal ADDR7 (the upper limit of range 7) and the address must necessarily be within range 8.

It should be appreciated that by always making the lower limit of the first range the first memory location within the memory, and always making the upper limit of the last range the last memory location in the memory, the circuitry associated with determining which range an address falls within is somewhat simplified, as is illustrated in FIGS. 1, 4 and 5. Specifically, only seven comparators are needed in module range logic 22A, rather than eight as would be the case if the first and eighth ranges were not at the first and last portions of the memory. Additionally, sixteen comparators would have been required if all ranges were independent of each other, i.e., by not having one module's first address immediately following the previous module's last address. The block identified as logic A is correspondingly simplified by the arrangement of memory 10.

FIG. 6 is a logic diagram of the common range logic 48 that was shown in FIG. 3A. As can be seen, common range logic 48 receives each of the range indicating bits P1-P8 from the output of module range logic 22A and the eight common range bits CMRG1-CMRG8 from the registers 44 (FIG. 3A). Each of the range indicating bits P1-P8 and its associated and correspondingly numbered one of the range bits CMRG1-CMRG8 are provided to one of eight AND gates 82-96. The outputs of the AND gates 82-96 are provided to an OR gate 98, which in turn provides the common match bit CM. As mentioned previously, the common match bit CM indicates whether the range within which the current memory address on bus 30 falls is a designated common range. If the current address is within a designated common range, then it can be included within the measurement of the range of the address that immediately preceded the current address on the bus 30.

For example, in the arrangement shown in Fig. 1, common subroutines A and B are both within range 7 which, in the described embodiment, can be designated as a common range by providing an enabled common range bit CMRG7 to registers 44. Whenever an instruction within range 7 is detected by the module range logic 22A (as indicated by the bit P7 being enabled), the common range logic 48 provides an enabled (logic level 1) common match signal CM at its output. This is accomplished by AND gate 94 in FIG. 6, which receives the enabled bit CMRG7 from the registers 44 and the enabled bit P7 from the module range logic 22A. The output of AND gate 94 is enabled and provided to the OR gate 98 so that the output of OR gate 98, which is the bit CM, is also enabled.

Figure 7B:
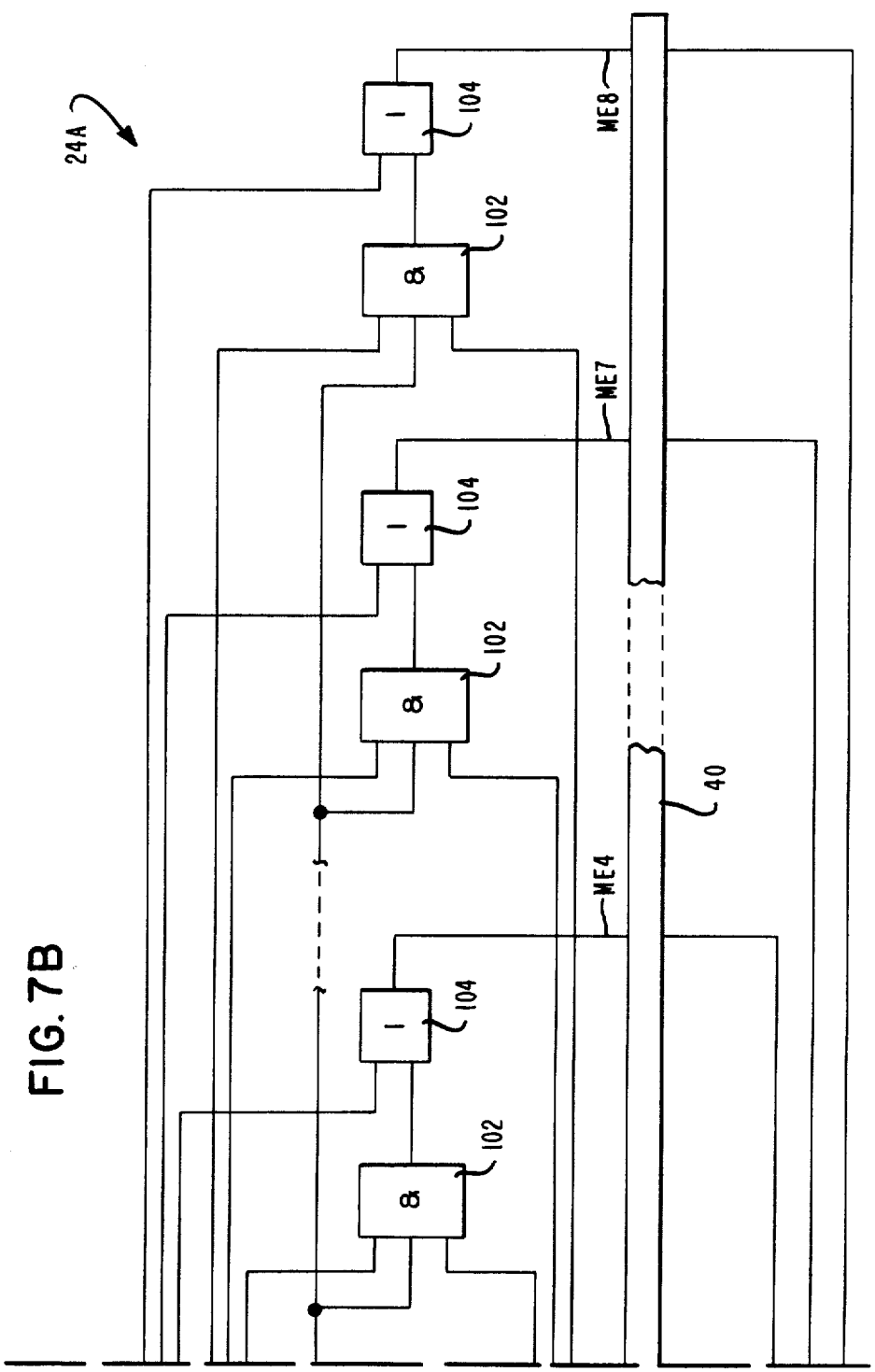

Turning now to FIGS. 7A and 7B, there is shown in detail the link logic 24A previously briefly described in conjunction with FIGS. 3A and 3B. As described earlier, link logic 24A controls the eight counters that maintain a measurement for each of the eight ranges, range 1 through range 8, illustrated in FIG. 1. As seen in FIG. 7A, the link logic 24A receives, by way of level 2 buffer register 38, the common match bit CM from common range logic 48 and the eight range indicating signals P1-P8 from module range logic 22A. In addition, the link logic 24A receives the eight common link bits CMLK1-CMLK8 from the registers 44. As mentioned earlier, the purpose of the link logic 24A is to cause each of the counters that maintains a measurement for its associated range to include in its measurement not only the execution of instructions within its range, but also to include the execution of any instructions or accessing of data in the common range or common subroutines when memory addresses within the common range immediately follow an address within the associated range. Since the execution of, for example, a call instruction in a selected range will cause the beginning address of the called common subroutine to next appear on the bus, the just-described method of measuring software module activity will include both measurements of the execution of instructions within the selected range and the execution of instructions in common subroutines called by the selected range. As should be apparent, it could also be used, by designating the data storage portion 16 as a common range, to include within the same measurement any accesses of data in the data storage portion by instructions within the selected range.

As seen in FIGS. 7A and 7B, the link logic 24A is comprised of eight AND gates, each designated 102, and eight OR gates, each designated 104. Each of the AND gates 102 receives the common match bit CM, an associated one of the common link bits CMLK1-CMLK8, and, from the feedback path 56, an associated and correspondingly numbered one of the measurement enabling bits ME1-ME8 previously stored in the level 3 buffer register 40.

Each of the OR gates 104 is paired with one of the AND gates 102 and receives one of the range indicating bits P1-P8, as well as the output of its AND gate 102. The output of each OR gate 104 is stored in the buffer register 40 as one of the measurement enabling signals or bits ME1-ME8.

In the operation of the link circuitry 24A, each of the bits ME1-ME8 is enabled only when the address on the memory bus 30 is either (1) within its associated range or (2) within a common range that is to be linked to (i.e., that immediately follows) its associated range. For example, referring to the arrangement shown in FIG. 1, if the current address on the memory bus is within range 4, then the bit P4 is enabled and is passed through the OR gate 104 associated with the measurement enabling bit ME4, so that the measurement enabling bit ME4 stored in the level 3 buffer register 40 and delivered to counter circuitry 26A is enabled. The counter associated with the range 4 is thus enabled for measuring. Further, if range 7, as previously mentioned, is a common range, then the bit CM (from common range logic 48, FIG. 6) provided to each of the AND gates 102 is enabled when an address within range 7 appears on memory bus 30. If it is desired to include addresses within the common range (range 7) in the measurement of instructions within range 4, then the common link bit CMLK4 is enabled when provided to registers 44 during initialization of the measuring apparatus. As a result, when the previous address on the memory bus 30 is within range 4 (with bit ME4 being enabled), and then the next address on memory bus 30 is within the common range (range 7), the AND gate 102 receiving the common link bit CMLK4 is enabled at its output by virtue of the three bits at its inputs (CM, CMLK4, and ME4) all being enabled. As a result, the bit ME4 stored in buffer 40 continues to be enabled during the next memory address cycle so that the counter associated with range 4 is enabled for measuring and including this instruction address within its measurement. Of course, at the same time, the bit ME7 is enabled so that the counter associated with range 7 is also enabled for counting.

The actual method for maintaining a measurement for each of the ranges could be accomplished in any one of a number of conventional ways. For example, the counter circuitry 26A (FIG. 3B) could simply be (as briefly mentioned earlier) a counter associated with and enabled by each of the bits ME1-ME8.

Figure 8:
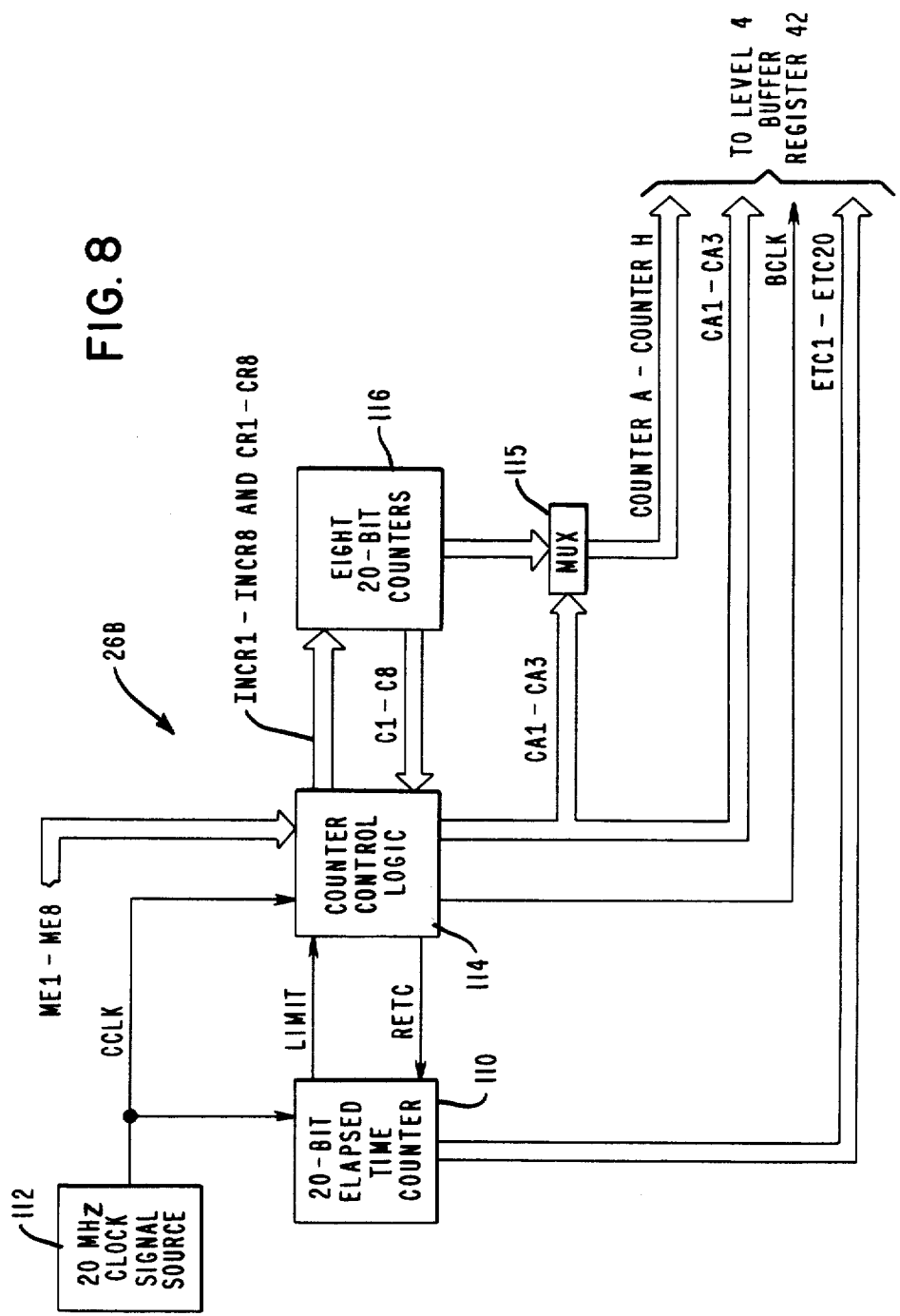
FIG. 8 is a block diagram of the counter circuitry in the measuring apparatus of FIGS. 3A and 3B.

In a data processing system where instructions are executed with high speed, however, a more complex counter circuit, such as that shown in FIG. 8 and designated 26B, would be preferred. The counter circuit 26B is seen as including a 20-bit elapsed time counter 110, a 20 MHz. counter clock signal source 112, counter control logic 114, a MUX 115, and eight 20-bit counters that are shown as a single block and designated 116. The purpose of the elapsed time counter 110 is to provide a point of reference for the output of the eight counters 116 as well as providing an enabling signal LIMIT to the counter control logic 114 for periodically reading the output of the eight counters 116. The elapsed time counter 110 receives the 20 MHz counter clock signal (CCLK) from the clock signal source 112 and provides an incrementing 20 bit output (ETC1-ETC20) and the enabling signal LIMIT. The signal LIMIT can conveniently be the 16th bit of the 20-bit output.

The counter control logic 114 receives the signal LIMIT from the elapsed time counter 110, the clocking signal CCLK from the clock signal source 112 and the measurement enabling bits ME1-ME8 from the level 3 buffer register 40. The counter control logic 114 provides increment clocking signals or bits (INCR1-INCR8) that cause each of the eight counters 116 to be clocked in response to one of the measurement enabling signals ME1-ME8, counter reset bits (CR1-CR8) that will reset each of the eight counters 116, an elapsed time counter reset bit (RETC) that will reset the elapsed time counter 110, and counter address bits (CA1-CA3) that sequentially address the MUX 115 to pass the output of a different one of the eight counters 116. The MUX 115 can be circuit no. SN74151A, from Texas Instruments, Incorporated.

The eight counters 116 return eight counter bits C1-C8 to the counter control logic 114. The bits C1-C8 are each the 16th bit of one of each of the eight counters 116, and their purpose will be described below in conjunction with FIGS. 9A and 9B. Each of the counters 116 can be circuit no. SN74393, from Texas Instruments.

The eight counters 116 provide each of their eight 20-bit outputs (COUNTERA-COUNTERH) to the MUX 115 which selects one to be presented to the level 4 buffer register 42. The buffer register 42 receives, in addition to one of the 20 bit outputs COUNTERA-COUNTERH, the three counter address bits CA1-CA3 from counter control logic 114, and the 20 bit output ETC1-ETC20 of the elapsed time counter 110. The level 4 buffer register is clocked by a buffer clock signal BCLK from the counter control logic.

Figure 9A:
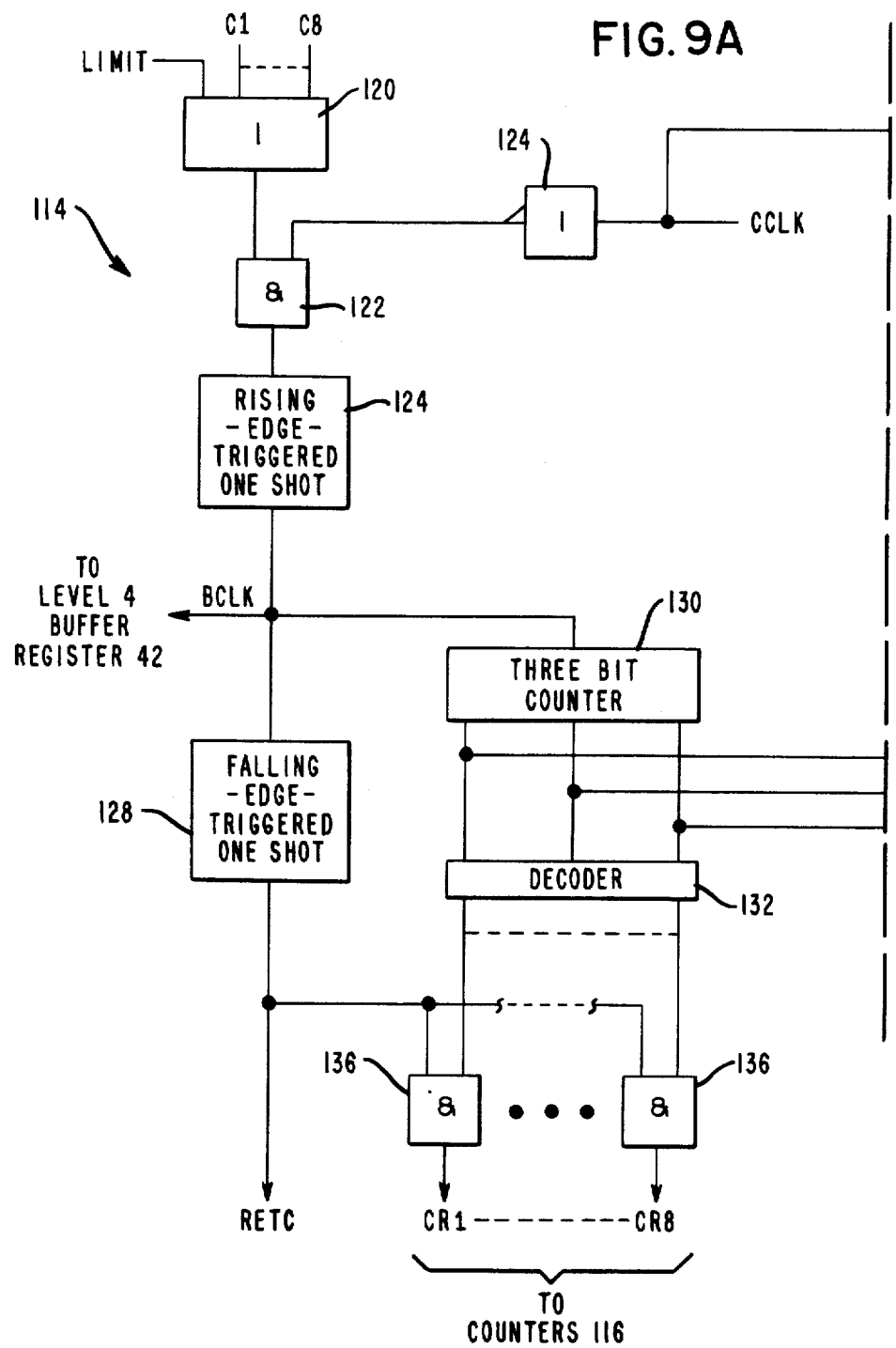

FIGS. 9A and 9B illustrate the circuitry within the counter control logic 114. The basic purpose of the counter control logic 114 is to cause each of the eight counters 116 (FIG. 8) to be properly incremented in response to the measurement incrementing signals ME1-ME8 and to provide the necessary control and clocking signals to the counters 116 and to the level 4 buffer register 42 in order to cause the contents of each of the eight counters 116 to be provided in sequential order to the level 4 buffer register 42.

As is seen in FIG. 9A, an OR gate 120 in the counter control logic 114 receives the bit LIMIT from the elapsed time counter 110 (FIG. 8) and the bits C1-C8 from the eight counters 116. The bits LIMIT and C1-C8 are, as mentioned earlier, the 16th bit for each of their respective counters. The purpose for receiving the bits C1-C8 at the counter control logic 114 is to prevent any of the eight counters 116 from overflowing. In particular, when any one of the counters is counted up to its 16th stage (as will be indicated by one of the bits C1-C8 being enabled and at a "1"), the counter control logic 114 will cause the contents of one or more of the eight counters to then be sequentially supplied to the buffer register 42. In addition, the bit LIMIT from the elapsed time counter is used to periodically cause the eight counters in the counter circuit 116 to be successively read out, even though none of their 16th bits have been enabled and none are close to overflowing.

The output of the OR gate 120 in FIG. 9A is provided to an AND gate 122, along with the clock signal CCLK from the clock signal source 112 (FIG. 8). The signal CCLK is provided to AND gate 122 by way of an inverter 124. The output of the AND gate 122 is provided to a rising-edge-triggered one shot 124 that provides in turn the previously-mentioned buffer clock signal BCLK. The one-shot 124 assures that the pulses in the clock signal BLCK are sufficiently wide to accomplish their intended purpose. The signal BCLK is provided to clock the level 4 buffer register 42 and is also provided to a falling-edge-triggered one shot 128 and a 3-bit counter 130. The output of the 3-bit counter 130 provides the 3-bit address (CA1-CA3) to the MUX 115 (FIG. 8) which in turn causes the output of one of the eight counters 116 to be provided to the level 4 buffer register 42. The output of the 3-bit counter 130 is also provided to a decoder 132, which provides eight bits that are each sequentially enabled and that are each provided to one of eight AND gates 136. The AND gates 136 also each receive the output of the one shot 128. The outputs of the AND gates 136 are the counter reset bits CR1-CR8, which are each used to reset one of the eight counters 116 after its count or bits have been passed by MUX 115.

The output of the one shot 128 (RETC) is also used to reset the elapsed time counter 110 (FIG. 8).

The operation of the counter control logic 114 as thus far described is as follows. When any one of the bits LIMIT and C1-C8 becomes enabled, as the elapsed time counter 110 and the eight counters 116 are incremented, an enabling signal is passed through the OR gate 120 and combined with the counter clock signal CCLK to trigger one shot 124 and thereby generate the buffer clock signal BCLK, to trigger the one shot 128, and to increment the 3-bit counter 130. The result is that the contents of one of the eight counters, as addressed by the 3-bit counter address bits CA1-CA3 and passed by MUX 115 (FIG. 8), is provided and stored in the level 4 buffer register 42. Momentarily later, the output of the one shot 128 changes, and the same counter is reset by the associated one of the counter reset signals CR1-CR8 at the output of AND gates 136 and the elapsed time counter 140 is reset by the bit RETC at the output of the one-shot 128.

If the bit LIMIT has been enabled, then the 3-bit counter 130 is incremented only once, and the next counter is not addressed until the bit LIMIT is again enabled or one of the bits C1-C8 is thereafter enabled. If, on the other hand, it is one of the bits C1-C8 that has been enabled, then the output of OR gate 120 remains enabled until that bit is reset. With each successive pulse in the clock signal CCLK, the next addressed one of the counters 116 is read out, stored in the level 4 buffer register 42, and reset. This is repeated until the counter whose 16th stage was the one of the bits C1-C8 that was enabled is stored in the level 4 buffer register 42 and then reset. At such time, the enabled one of the bits C1-C8 is reset and no further counters are addressed.

The counter control logic 114 also has circuitry (seen in FIG. 9B) for causing each of the eight counters 116 to be incremented, in response to the bits ME1-ME8, to measure the execution of instructions. In particular, there is associated, with each one of the eight counters 116, an AND gate 144. Each AND gate 144 receives the counter clock signal CCLK from the clock signal source 112 (FIG. 8) and a corresponding one of the measurement enabling bits ME1-ME8. The outputs of the AND gates 144 and 146 each provide one of the eight signals INCR1-INCR8. As mentioned earlier, the signals INCR1-INCR8 are each a clock signal for incrementing an associated one of the eight counters 116.

In operation, each of the counters 116 will count the period of time that addresses within its associated range are on the memory bus. If one of the measurement enable signals ME1-ME8 is at a 1 (indicating that addresses on bus 30 are within its associated range or a linked common range), then the pulses of the counter clock signal CCLK are passed through AND gate 144 as one of the signals INCR1-INCR8 and cause the corresponding one of the eight counters to increment as long as addresses within its associated range appears on the memory bus.

It should be apparent to those skilled in the art that other methods could be used, within the purview of the present invention, to make the measurement associated with each of the ranges. For example, rather than measuring the period of time of execution within a given range, the counters 116 could be controlled to increment once for each instruction within the range (or its called common subroutines), so that the count maintained by each of the counters represents the actual number of executed instructions or accessed memory locations associated with that range.

Although the presently preferred embodiment of the present invention has been described, it should be appreciated that within the purview of the present invention various changes may be made within the scope of the appended claims.

I claim:

1. An apparatus for measuring the execution of instructions, each of the instructions stored in a memory at a memory location having a memory address associated therewith, the memory being accessed by a memory bus for carrying memory addresses thereon, said apparatus comprising:
    range detection means connected to said memory bus and responsive to the memory addresses thereon for detecting memory addresses within a first range and memory addresses within a second range;
    counter means enabled in response to said range detection means for incrementing said counter means at least once for each presence on said memory bus of a memory address within said first range; and
    link logic means connected to said range detection means and said counter means for enabling said counter means to also be incremented at least once for each presence of a memory address within said second range when an address within said second range is on said memory bus immediately following an address within said first range.

2. The apparatus of claim 1, further comprising second counter means associated with said second range and enabled in response to said range detection means for incrementing said second counter means at least once for each presence on said memory bus of a memory address within said second range.

3. The apparatus of claim 1, wherein the instructions in the memory are arranged in a plurality of ranges, including said first and second ranges, wherein said range detection means detects memory addresses within each one of said plurality of ranges in addition to said first and second ranges, and wherein said apparatus further comprises a separate counter means associated with each one of said plurality of ranges in addition to said first range;
    each said separate counter means being incremented at least once for each presence on said memory bus of a memory address within the associated one of said plurality of ranges.

4. The apparatus of claim 3, wherein each memory address falls within one of said plurality of ranges, and wherein the first address within one of said ranges is the beginning address of the memory, and the ending address of another of said plurality of ranges is the ending address of said memory.

5. The apparatus of claim 1, wherein said range detection means is provided with predetermined range limit addresses indicating the address limits of said first and second ranges, and wherein said range detection means includes at least one comparator for comparing the range limit addresses to the addresses carried on said memory bus.

6. The apparatus of claim 1, wherein said counter means includes a binary counter, said counter being periodically incremented during a period of time that an instruction within said first range is on said memory bus and an instruction within said second range is on said memory bus immediately following an instruction within said first range.

7. An apparatus for measuring the execution of instructions stored at memory locations within the memory of a data processing system comprising:
    range detection means for receiving an address associated with each of the memory locations for detecting memory addresses within a first range;
    counter means connected to said range detection means and enabled in response thereto for incrementing said counter means at least once for each memory address received within said first range;
    said range detection means including means for detecting memory addresses within a second range; and
    linking means connected to said range detection means for enabling said counter means to be incremented at least once for each memory address received within said second range when an instruction within said second range immediately follows an instruction within said first range.

8. The apparatus of claim 7 in which said memory includes a plurality of software modules, each said software module having a plurality of instructions which perform when executed a major function in the data processing system, said memory also including at least one common subroutine having a plurality of instructions which are executed during the execution of at least some of said software modules, and wherein all the instructions of one of said software modules are within said first range and all of the instructions within said one common subroutine are within said second range.

9. The apparatus of claim 7, wherein the memory locations of the memory are arranged in a plurality of ranges, wherein the first memory location of one of said ranges is the beginning memory location in the memory, wherein the last memory location of another of said ranges is the last memory location in the memory, wherein each memory location in the memory is accessed by an associated address on a memory bus connected to the memory, and wherein the range detection means comprises module range logic connected for receiving the address on said memory bus and providing range indicating bits for indicating which of said plurality of ranges the address on said memory bus is within.

10. The apparatus of claim 9, further comprising means for supplying common range bits and also comprising common range logic for receiving said common range bits indicating which of said plurality of ranges is said second range, said common range logic being connected to said module range logic for receiving said range indicating bits and for providing a common match bit at its output indicating when the address on said memory bus is within said second range.

11. The apparatus of claim 10, wherein said range detection means comprises a comparator associated with each of said first and second ranges, each said comparator for receiving a range limit address signal indicating the address limits of its associated range and for receiving the address on said memory bus, and for comparing the range limit address signal to the address on said memory bus to determine if the address on said memory bus falls within its associated range.

12. An apparatus for measuring the time of execution of software instructions stored at memory locations in the memory of a data processing system, wherein each memory location is accessed by an associated memory address carried on an address bus connected to the memory, the measuring apparatus comprising:

module range logic connected to said address bus for receiving each memory address carried thereon and connected for receiving a plurality of range limit addresses that define a plurality of address ranges within the memory, wherein the number of address ranges is one greater than the number of range limit addresses, and wherein one of said address ranges begins at the same address as the first memory location in the memory, and another of said address ranges ends at the same address as the last memory location in the memory, said module range logic including a plurality of comparators, the number of said comparators being the same as the number of range limit addresses, each of said comparators receiving one of said range limit addresses and the memory address on the memory address bus for comparing its one of said range limit addresses to the memory address and providing output signals indicating whether the memory address is less than, equal to, or greater than its one of said range limit addresses, and logic circuitry for receiving the outputs of each of said comparators and providing range indicating bits, each of said range indicating bits corresponding to one of said address ranges and indicating whether the memory address is within its corresponding address range;

common range logic for receiving the range indicating bits from said module range logic and for receiving a plurality of common range bits that each corresponds to one of said address ranges and that indicate if its corresponding address range is a common range, said common range logic providing at its output a common match bit indicating whether the memory address carried on the memory bus is within the common range;

link logic for receiving a plurality of common link bits, each common link bit associated with one of said address ranges and indicting whether a measurement of addresses within its associated one of said address ranges is to have included therein a measurement of addresses within the common range indicated by the common range bits for receiving the common match bit, and for receiving the range indicating bit from said module range logic, said link logic for providing a measurement enabling bit for each of said address ranges;

a buffer register for receiving and storing each measurement enabling bit;

said link logic including an AND gate and a paired OR gate associated with each one of said address ranges, each AND gate receiving the common match bit, the common link bit of its associated address range, and the previous measurement enabling bit of its associated range stored in said buffer register, each OR gate receiving the output of its AND gate and the range indicating bit of its associated address range, each said OR gate providing the measurement enabling bit of its associated range for storage in said buffer register; and counter circuitry, including a counter associated with each of said address ranges and enabled by the measurement enabling signal of its associated address range, so that each said counter maintains a count representing a measurement of time that addresses within its associated range are on the memory bus and if its associated common link bit indicates that a measurement of the time that addresses within the common range is to be included, such measurement of time that the addresses are within the common range is included in the last-named counter if an address within the common range immediately follows an address within the associated address range on the memory bus.

13. The apparatus of claim 12, wherein said counter circuitry further includes counter control logic for receiving each measurement enabling signal and for controlling each said counter, said counter control logic providing a clocking signal to each said counter during the period of time in which addresses within its associated range are on the memory bus.

14. An apparatus for measuring the time required for executing instructions from a memory; each said instruction being stored in said memory at a memory location having a memory address associated therewith; said instructions being grouped into a plurality of software modules and at least one common software module, said instructions being accessed by a memory bus which carries memory addresses thereon; said apparatus comprising:

range detection means connected to said memory bus and being responsive to the memory addresses thereon for determining which one of said plurality of software modules including said common software module is being executed;

counter means connected to said range detection means for producing a count which reflects the time required for executing the instructions associated with one of said plurality of software modules as determined by said range detection means; and
link logic means connected to said range detection means and said counter means for increasing the count on said counter means to correspond to the time required for executing the instructions associated with said common software module when an address from said common software module is placed on said memory bus immediately after an address from one of said plurality of software modules is placed thereon.

* * * * *